US012676838B2

(12) United States Patent
Ryu et al.

(10) Patent No.: US 12,676,838 B2
(45) Date of Patent: Jul. 7, 2026

(54) BLOCKCHAIN BASED SECURITY SYSTEM AND METHOD USING WAAP/API LEVEL MANAGEMENT

(71) Applicant: Penta Security Inc., Seoul (KR)

(72) Inventors: Ji Hye Ryu, Uiwang-si (KR); Min Chul Kim, Seoul (KR); Jin Hyeok Oh, Gwangmyeong-si (KR); Keon Yun, Seoul (KR); Yun Jin Oh, Seoul (KR); Kwang Geun Park, Anyang-si (KR); Tae Gyun Kim, Yongin-si (KR)

(73) Assignee: Penta Security Inc., Seoul (KR)

( * ) Notice: Subject to any disclaimer, the term of this patent is extended or adjusted under 35 U.S.C. 154(b) by 120 days.

(21) Appl. No.: 18/934,135

(22) Filed: Oct. 31, 2024

(65) Prior Publication Data

US 2026/0075042 A1 Mar. 12, 2026

(30) Foreign Application Priority Data

Sep. 6, 2024 (KR) ........................ 10-2024-0121736

(51) Int. Cl.
*H04L 9/40* (2022.01)
*H04L 43/50* (2022.01)

(52) U.S. Cl.
CPC .......... *H04L 63/0428* (2013.01); *H04L 43/50* (2013.01); *H04L 63/1433* (2013.01)

(58) Field of Classification Search
CPC .. H04L 63/0428; H04L 63/1433; H04L 43/50
See application file for complete search history.

(56) References Cited

U.S. PATENT DOCUMENTS

| | | | |
|---|---|---|---|
| 2018/0211043 A1* | 7/2018 | Husain ................ | G06Q 10/101 |
| 2018/0255089 A1* | 9/2018 | Wilton ............... | H04L 63/1433 |
| 2020/0311723 A1* | 10/2020 | Miller .................. | G06Q 40/04 |
| 2021/0336934 A1 | 10/2021 | Deshmukh et al. | |
| 2021/0377222 A1 | 12/2021 | Sharma et al. | |
| 2024/0073248 A1* | 2/2024 | Barton ................. | H04L 63/20 |
| 2024/0314169 A1* | 9/2024 | Azad ................... | H04L 63/1491 |
| 2024/0430111 A1* | 12/2024 | Anisetti ................ | H04L 9/50 |
| 2025/0036489 A1* | 1/2025 | Griffin .................. | G06F 9/541 |
| 2025/0063019 A1* | 2/2025 | Fehse ................. | H04L 63/0236 |
| 2025/0193025 A1* | 6/2025 | Dusgotra ............. | H04L 9/3263 |

FOREIGN PATENT DOCUMENTS

| | | | | |
|---|---|---|---|---|
| CN | 119485310 A | * | 2/2025 | ............ H04W 12/03 |

* cited by examiner

*Primary Examiner* — Ghodrat Jamshidi
(74) *Attorney, Agent, or Firm* — BROADVIEW IP LAW, PC

(57) ABSTRACT

Disclosed is a blockchain-based security method that is performed by an integrated web security solution (web application and API protection, WAAP) and using WAAP and application programming interface (API) level management. The blockchain-based security method may comprise: receiving an API safety grade check request from the blockchain under a session establishment with the blockchain, wherein, in the checking of the API safety grade, a security level for vulnerability of the API is checked by itself in management API data of the WAAP with a highest level of safety; and transmitting information on the API safety grade to the blockchain.

16 Claims, 8 Drawing Sheets

Figure 6:
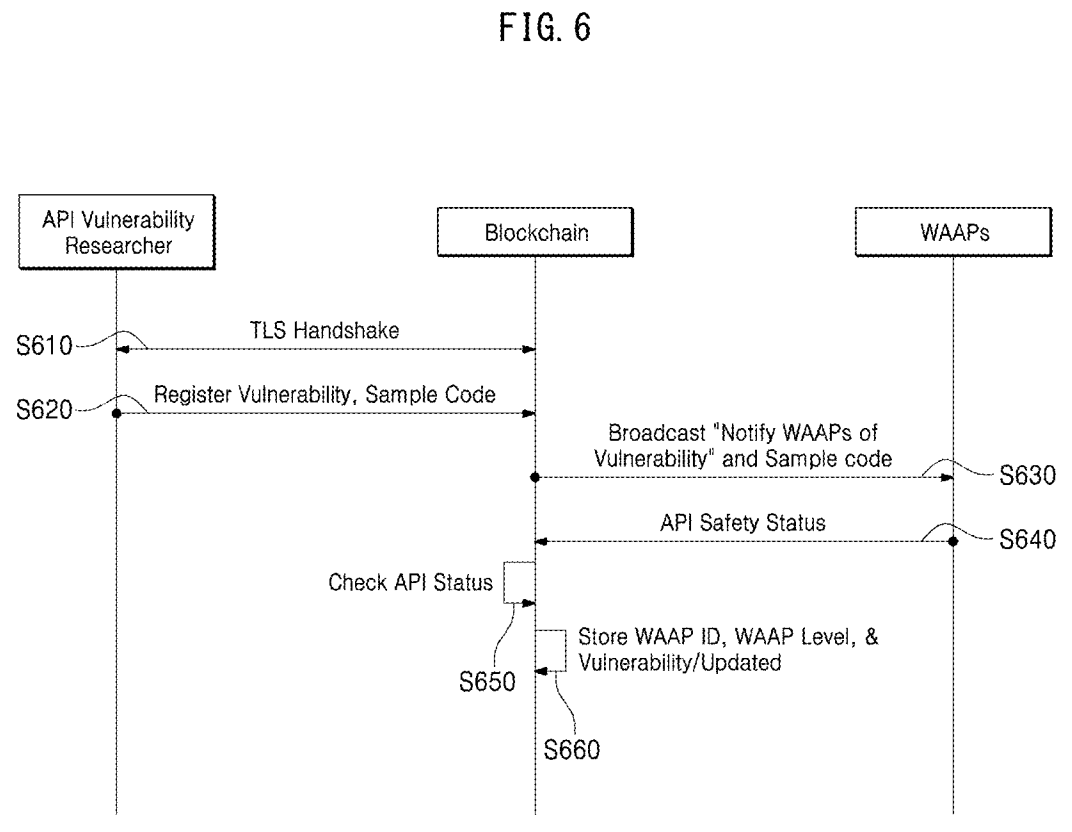

| API Vulnerability Researcher | Blockchain | WAAPs |

S610 — TLS Handshake

S620 — Register Vulnerability, Sample Code

Broadcast "Notify WAAPs of Vulnerability" and Sample code — S630

API Safety Status — S640

Check API Status — S650

Store WAAP ID, WAAP Level, & Vulnerability/Updated — S660

PROCESSOR

MEMORY

INPUT INTERFACE
DEVICE  ～850

OUTPUT INTERFACE
DEVICE  ～80

STORAGE
DEVICE  ～840

TRANSCEIVER  ～830

～900
～910
～920  HANDSHAKE PROCESSING UNIT

～930  API SAFETY GRADE VERIFICATION UNIT

～940  NOTIFICATION PROCESSING UNIT

～950  VERIFICATION TOOL

BLOCKCHAIN BASED SECURITY SYSTEM AND METHOD USING WAAP/API LEVEL MANAGEMENT

CROSS-REFERENCE TO RELATED APPLICATIONS

This application claims priority to Korean Patent Application No. 10-2024-0121736, filed on Sep. 6, 2024, with the Korean Intellectual Property Office (KIPO), the entire contents of which are hereby incorporated by reference.

BACKGROUND

1. Technical Field

Example embodiments of the present disclosure relate to a blockchain-based security system and method capable of defending against various attacks on public or private networks by granting a life cycle to an application programming interface (API) and managing a web application and API protection/API (WAAP/API) level in an integrated web security solution such as cloud-based WAAP.

2. Related Art

Recently, social activity, economic activity, etc., have been actively conducted online such as on the Internet. Therefore, the importance of security is increasing in an application programming interface (API) that is widely used for communication between online terminals.

The API is a set of definitions and protocols for building and integrating application software. Using the API, terminals such as a client and a server may support communication between products or services of the terminals without the need to build a connection infrastructure. For example, in the API communication, a client transmits a key value to a server for accessing data, and when the key value is correct, the server may transmit data to the client.

Meanwhile, as the use of the API expands, hacking and security incidents regarding MyData such as credit information data, personal information such as login information, and public data such as weather, bus information, and medical information are also increasing. For example, security incidents due to API attacks such as obtaining information by compromising user authentication or keys, intentionally allocating large amounts of system resources, or intercepting response data are increasing.

In order to prevent such security incidents, individuals and companies should introduce security solutions for their networks connected to the Internet, etc., but there is a burden in introducing single function solutions. Therefore, the demand for integrated web security solutions that can comprehensively protect the web environment in consideration of cost issues, etc., is increasing.

In particular, recent integrated web security solutions are evolving into integrated web security solutions with API protection, bot mitigation, and distributed denial of service (DDoS) defense in addition to the existing web application firewall (WAF) function. In this atmosphere, the demand for integrated web security solutions with API security functions that satisfy Open Worldwide Application Security Project (OWASP) API security Top 10 is increasing.

SUMMARY

Example embodiments of the present disclosure have been derived to meet the needs of the above-described related art, and provide an integrated web security solution with an application programming interface (API) security function to the existing web application firewall (WAF) function.

That is, example embodiments of the present disclosure provide an API reliability guarantee security system and method that use a distributed synchronization technology of blockchain to generate an API life cycle and use a technology of configuring a web application and API protection (WAAP) ecosystem and an integrity guarantee technology of blockchain.

In addition, example embodiments of the present disclosure provide a security system and method capable of securing trust in a security solution by integrating a blockchain technology into an integrated web security solution to configure a management ecosystem for not only an API to be secured but also WAAP itself which is an integrated web security solution.

That is, example embodiments of the present disclosure provide a security system and method based on a WAAP target verification and management technology that uses a distributed synchronization technology which is a unique feature of blockchain.

According to a first exemplary embodiment of the present disclosure, a blockchain-based security method that is performed by an integrated web security solution (web application and API protection, WAAP) and using WAAP and application programming interface (API) level management may comprise: receiving an API safety grade check request from the blockchain under a session establishment with the blockchain, wherein, in the checking of the API safety grade, a security level for vulnerability of the API is checked by itself in management API data of the WAAP with a highest level of safety; and transmitting information on the API safety grade to the blockchain.

The WAAP may have a level 1 grade indicating the most secure WAAP in terms of security, and the blockchain may store WAAP identification information of the WAAP and a list of APIs with safety grade 1 registered on the WAAP.

Blockchain synchronization with the corresponding WAAPs may be completed for the list of APIs at safety grade 1, which is the safest level of security.

The blockchain-based security method may further comprise: receiving an API sample code for WAAP vulnerability testing from the blockchain, wherein the API sample code is a malicious sample code.

The blockchain-based security method may further comprise: calculating a safety grade for the API sample code for WAAP vulnerability testing.

The blockchain-based security method may further comprise: transmitting information on the API safety grade status including the calculated safety grade to the blockchain.

The blockchain may classify a WAAP for which the safety grade of the API sample code for WAAP vulnerability testing is calculated as a highest level based on the information on the API safety grade status as a WAAP vulnerable to security and downgrade a level of the WAAP.

The blockchain may classify a WAAP for which the safety grade of the API sample code for WAAP vulnerability testing is calculated as a lowest level based on the information on the API safety grade status as a stable WAAP and upgrade a level of the WAAP.

The blockchain-based security method may further comprise: requesting a test of the WAAP from the blockchain; receiving an API sample code safety grade confirmation request from the blockchain; and transmitting API safety grade status information including confirmation information on the API safety grade to the blockchain.

According to a second exemplary embodiment of the present disclosure, a blockchain-based security method that is performed by an integrated web security solution (web application and API protection, WAAP) and using WAAP and application programming interface (API) level management may comprise: requesting a test of a WAAP from the blockchain through a session established with the blockchain; receiving an API sample code safety grade confirmation request from the blockchain; and performing a self-vulnerability test on the API sample code received from the blockchain; calculating an API safety grade after performing the vulnerability test; and transmitting API safety grade status information including check information on the API safety grade to the blockchain.

The blockchain-based security method may further comprise, before requesting the test of the WAAP, self-upgrading a function of the WAAP by itself with administrator authority of the WAAP.

The blockchain may classify a WAAP for which the safety grade of the API sample code for WAAP vulnerability testing is calculated as a highest level based on the information on the API safety grade status as a WAAP vulnerable to security and downgrade a level of the WAAP, or the blockchain may classify a WAAP for which the safety grade of the API sample code for WAAP vulnerability testing is calculated as a lowest level based on the information on the API safety grade status as a stable WAAP and upgrade a level of the WAAP.

According to a third exemplary embodiment of the present disclosure, a blockchain-based security system using an integrated web security solution (web application and API protection, WAAP) and application programming interface (API) level management may comprise: a memory; and at least one processor connected to the memory and executing a program including at least one command, wherein, by the at least one command, the processor allows the WAAP to receive an API safety grade confirmation request from the blockchain under a session establishment with the blockchain, confirm the API safety grade, and transmit check information on the API safety grade to the blockchain.

The WAAP may have a level 1 grade indicating the most secure WAAP in terms of security, the blockchain stores WAAP identification information of the WAAP and a list of APIs with safety grade 1 registered on the WAAP, and the blockchain may complete blockchain synchronization with the corresponding WAAPs targeting the list of APIs with a highest level of safety grade of the security.

The processor may further perform: receiving an API sample code for WAAP vulnerability testing from the blockchain, calculating a safety grade for the API sample code for WAAP vulnerability testing, and transmitting information on an API safety grade status including the calculated safety grade to the blockchain.

The blockchain may classify a WAAP for which the safety grade of the API sample code for WAAP vulnerability testing is calculated as a highest level based on the information on the API safety grade status as a WAAP vulnerable to security and downgrade a level of the WAAP.

The blockchain may classify a WAAP for which the safety grade of the API sample code for WAAP vulnerability testing is calculated as a lowest level based on the information on the API safety grade status as a stable WAAP and upgrade a level of the WAAP.

The processor may further perform: requesting the test of the WAAP from the blockchain, receiving an API sample code safety grade confirmation request from the blockchain.

The processor may further perform: transmitting API safety grade status information including check information on the API safety grade to the blockchain.

The processor may further perform: self-upgrading the function of the WAAP with the administrator authority of the WAAP before the requesting of the test of the WAAP from the blockchain or requesting retest for WAAP level correction according to the WAAP level downgrade adjustment as a result of a previous test.

According to the present disclosure, by establishing an API management system based on a "distributed synchronization" technology which is a unique characteristic technology of blockchain and a management system of WAAP which is an integrated web security solution, it is possible to obtain features and advantages in API security, and by securing API reliability based on an "integrity guarantee" technology which is another unique characteristic technology of blockchain, it is possible to solve a technical task of providing a user with safe API use.

In addition, according to the present disclosure, a blockchain-based security system using WAAP/API level management can be largely divided into three parts: "API management effect," "WAAP management effect," and "authenticated API use effect" using a blockchain technology.

Specifically, the "API management" using the blockchain technology refers to a technique in which the WAAP calculates an API level from the safest rating 1 to the most vulnerable rating 3 for an API and manages a safety grade and other API information by registering the safety grade and other API information on the blockchain. According to this blockchain-based "API management" technique, by causing the safety grade and information of the API to be shared among all nodes in the blockchain network, it is possible to derive the management effect of information sharing based on the distributed storage technology of the blockchain, and by preventing the safety grade and other information of the API registered on the blockchain from being tampered with, it is possible to derive the reliable API management effect based on the data integrity guarantee technology of the blockchain.

In addition, the "WAAP management" using the blockchain technology refers to a technique in which a WAAP function test is performed on all WAAPs linked to the blockchain network to calculate the WAAP level from the most stable rating 1 to the most unstable rating 3 and manage a test target WAAP identifier (WAAP ID) and WAAP rating by registering the test target WAAP ID and WAAP rating on the blockchain. This technique uses a "distributed synchronization" technology which is a unique characteristic of the blockchain, and can be performed by a method of registering a WAAP function test sample code on the blockchain, propagating a code to all WAAPs linked to each other, and then checking a response value. According to the blockchain-based "WAAP management" technique, it is possible to derive a management effect of continuously updating and advancing WAAP which is an API verification solution, and ultimately, it is possible to derive a WAAP management effect of increasing user satisfaction by improving user reliability.

As described above, according to the present disclosure, by using the characteristic technologies of the blockchain, such as "distributed synchronization of data" and "guaranteeing integrity of data forgery prevention," the integrated security solution can systematically perform the functions of the "API management" and "WAAP management," and therefore users will be assured of the use of the safe and certified API. In other words, according to the present disclosure, it is possible to provide the "authenticated API use effect."

In addition, the uniqueness and features and advantages of the security technology of the present disclosure described above lie in the fact that it establishes the API and WAAP management policies in a dynamic manner rather than a static manner. This is a method of managing API and WAAP management by granting a "life cycle" to the API and WAAP management by configuring the network of the integrated web security solution via the blockchain, rather than statically establishing the API and WAAP management policies for each device. According to this configuration, it is possible to provide the integrated web security solution having the function of protecting the overall web environment. That is, in addition to the web security, it is possible to provide the WAAP with additional functions of API protection, bot mitigation, and DDoS defense.

In addition, according to the present disclosure, it is possible to effectively manage not only the API security but also the overall infrastructure and web services through the WAAP.

BRIEF DESCRIPTION OF DRAWINGS

FIG. 2 is a schematic conceptual diagram of a web application and API protection (WAAP)-based security system for client API security according to an embodiment of the present disclosure.

FIG. 5 is a flowchart for describing an API blockchain registration check and registration process that may be employed in a security method according to an embodiment of the present disclosure.

FIG. 6 is a flowchart illustrating a WAAP vulnerability discovery and update process that may be employed in a security method according to an embodiment of the present disclosure.

FIG. 7 is a flowchart for describing a level recovery and re-grade request process after a WAAP update that may be employed in a security method according to an embodiment of the present disclosure.

DETAILED DESCRIPTION OF THE EMBODIMENTS

Figure 1:
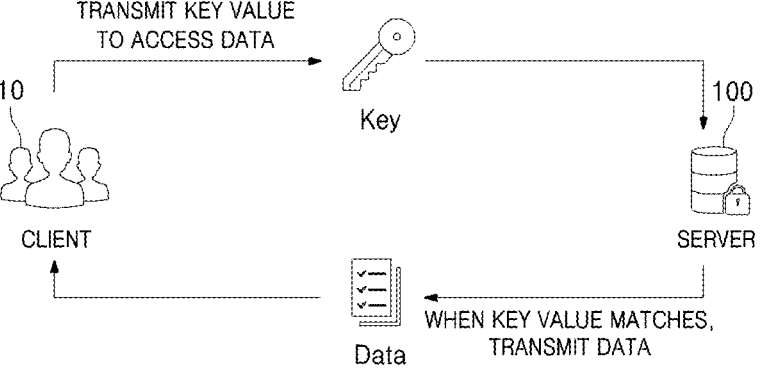
FIG. 1 is an exemplary diagram for describing application programming interface (API) communication that may be employed in a method according to an embodiment of the present disclosure.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is an exemplary diagram for describing application programming interface (API) communication that may be employed in a method according to an embodiment of the present disclosure.

Referring to FIG. 1, in API communication, a client 10 establishes a connection session with a server 100 and transmits a key value for accessing specific data to the server 100. When the key value is correct, the server 100 may transmit data to the client 10.

Meanwhile, various attacks from malicious users such as hackers may occur in the above-described API communication. Points where Main API attack vulnerabilities occur in the API communication are as follows.

First, the client 10 may transmit an API key that does not conform to a format to the server 100. In this case, when the server 100 does not perform an appropriate verification process, various problems may occur. In other words, vulnerabilities such as API format ignorance and null character injection may occur. Here, "API format ignorance" refers to a situation where, when the API key is stipulated to conform to a specific format such as a specific length or character combination, the server 100 does not properly verify the specific format, allowing arbitrary data to be registered as the API key. In addition, "null character injection" refers to a situation where the server 100 fails to properly handle null characters during the API verification process, allowing an attacker to transmit a key including null characters and bypass key verification logic.

In addition, the client 10 may have a hard-coded API key. Because the hard-coded encryption key is directly stored in a source code, there is a risk that the hard-coded encryption key will be exposed together with the source code when the source code is leaked, and there is a security weakness in that the hard-coded encryption key is not easily changed in response to a change in the environment. In other words, when the hard-coded encryption key is used in the source code, it is vulnerable to brute-force attacks, and some hash functions that are hard-coded in the form of a constant can be reversely calculated, which may lead to the leakage of encrypted information.

In addition, there are vulnerabilities that may include an API format defect in the server 100. The API format may include an API message format, and UTF-8 encoding in a JavaScript Object Notation (JSON) type may be used as the API message format. "JSON" may refer to an open standard message format that expresses data objects in the form of a property and a value, that is, "key: value", to transmit/receive small-capacity messages. "UTF-8" refers to a standard encoding method that may express all character codes in the world by extending the ASCII code. When the server 100 does not properly process the UTF-8 encoding during the API communication, the security vulnerabilities may arise due to broken characters. "Broken character vulnerability" refers to a vulnerability in which, when the client 10 transmits data using incorrect UTF-8 encoding and the server 100 does not correctly process the data, causing data corruption, the broken characters may disrupt the system and lead to a buffer overflow attack.

Additionally, during the API call process in which the client 10 transmits the API key value to the server 100 to receive data from the server 100, traffic interception may occur through a man in the middle attack (MITM), address resolution protocol (ARP) spoofing, or domain name system (DNS) spoofing from a disguised server or a disguised client. In other words, the traffic may be intercepted during the API call process in which the client transmits the API key value to the server to receive data from the server.

In order to defend against attacks occurring in the above-described major API attack vulnerabilities, it is preferable to encrypt and store the encryption key in an external space or file. In addition, it is preferable to manage the encryption key using an encryption code generated based on a seed and an initial vector extracted from a random function, for example. As the random function, a random function with enhanced security that may be obtained through an RNGCryptoServiceProvider class of .NET, which generates cryptographically secure random numbers, may be used.

However, since the above-described API protection method is performed in the API communication in the web environment, the security vulnerabilities occurring in the web environment may occur similarly to the API vulnerabilities.

For example, the items in the Open Worldwide Application Security Project (OWASP) Web Security Top 10 are listed in Table 1 below.

TABLE 1

| No | OWASP Web Application Security Top 10 (2023) |
|---|---|
| A01 | Broken Access Control |
| A02 | Cryptographic Failures |
| A03 | Injection |
| A04 | Insecure Design |
| A05 | Security Misconfiguration |
| A06 | Vulnerable and Outdated Components |
| A07 | Identification and Authentication Failures |
| A08 | Software and Data Integrity Failures |
| A09 | Security Logging and Monitoring Failures |
| A10 | Server-Side Request Forgery (SSRF) |

In addition, the items of the OWASP API Security Top 10 and their descriptions are shown in Table 2 below.

TABLE 2

| No. | OWASP API Security Top 10 (2023) | Security Risk Description |
|---|---|---|
| 1 | Broken Object Level Authorization | When an endpoint that processes object identifiers in an API is exposed, an attack surface for object access control is generated. |
| 2 | Broken Authentication | When an authentication mechanism is improperly implemented, an attacker may intercept authentication tokens or intercept other users' identities. |
| 3 | Broken Object Property Level Authorization | Leads to information exposure or manipulation by unauthorized parties. |
| 4 | Unrestricted Resource Consumption | To process an API request, resources, such as a network bandwidth, a CPU, memory, and storage, are required. In particular, because APIs such as email/short message service (SMS)/phone/biometric |

TABLE 2-continued

| No. | OWASP API Security Top 10 (2023) | Security Risk Description |
|---|---|---|
| | | verification are charged per request to a service provider, a successful denial of service (DoS) attack may lead to increased operating costs. |
| 5 | Broken Function Level Authorization | Authentication flaws may occur due to other complex access control policies and unclear distinction between management and general functions according to hierarchy, group, and role. |
| 6 | Unrestricted Access to Sensitive Business Flows | APIs with the corresponding vulnerabilities risk exposing business flow, and damage can occur when excessive access occurs in an automated manner. |
| 7 | Server Side Request Forgery (SSRF) | SSRF flaws occur when an API fetches a remote resource without validating a uniform resource identifier (URI) provided by a user. An attacker may transmit a request made for an unexpected target to an application program, even when protected by a firewall or a virtual private network (VPN). |
| 8 | Security Misconfiguration | For a complex configuration supported for use of customized API, various types of attacks may occur when DevOps engineers miss security settings or do not follow best procedures |
| 9 | Improper Inventory Management | An API inventory is a full list of APIs used across an organization or software, and the APIs are exposed to more endpoints than a typical web application, so there is a need to manage the API inventory up to date |
| 10 | Unsafe Consumption of APIs | Since developers trust data received from third-party APIs more than user input, they tend to adopt weaker security standards, and attackers may exploit this to attack third-party services instead of directly attacking the target API |

In the case where security vulnerabilities occurring in a web environment occur similarly to API vulnerabilities, for example, items A03, A05, and A09 in the OWASP Web Security Top 10 shown in Table 1 are the same as items A07, A08, and A10 in the OWASP API Security Top 10 shown in Table 2, and items A01, A07, and A08 in the OWASP Web Security Top 10 are similar to items A02, A05, and A09 in the OWASP API Security Top 10.

Figure 2:
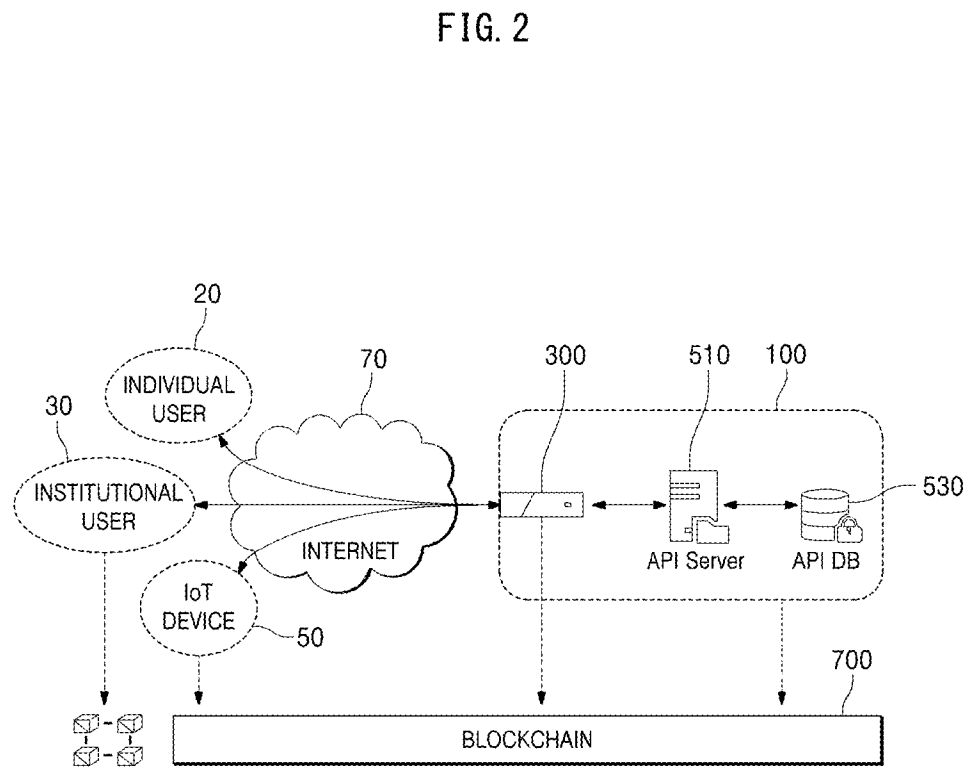

FIG. 2 is a schematic conceptual diagram of a web application and API protection (WAAP)-based security system for client API security according to an embodiment of the present disclosure.

Referring to FIG. 2, the WAAP-based security system (hereinafter referred to simply as the "security system") includes WAAP 300, an API server 510, and an API DB 530. A security system may be referred to as a security apparatus.

The WAAP 300 is a type of integrated web security solution, and is configured to perform web application security and API security. The WAAP 300 may include a service provider and a hash verification tool. In addition, the WAAP 300 may be configured to have functions of a web application firewall (WAF), API security, bot mitigation, and distributed denial of service (DDoS) defense. Since the WAAP 300 is described in detail in the detailed description below referring to FIG. 3, etc., a detailed description thereof is omitted here to avoid duplication.

The API server 510 may be a server in API communication that responds to an API request. The API server 510 may be a service API server of a client private network or an internal network.

The API DB 530 may be an off-chain database (DB) that stores and manages the API. The API DB 530 may be an internal API management database of a client internal network.

The above-described security system includes the cloud-based WAAP 300 specialized in service APIs, and may be configured to grant a life cycle to the API by the WAAP 300.

Additionally, the security system may migrate API information from an API server 510 to an API DB 530 for client internal network security and security grade calculation for the API. In addition, the security system may migrate the API information from the API server 510 to the WAAP 300. In addition, the security system may tag an identifier (ID) of the API to at least one API received from the API server 510 in the WAAP 300 and then store an API hash value. In addition, when service users outside a client request the WAAP 300 of the service providing client (i.e., the service provider) to verify the safety of the API received from the service server (i.e., the API server) of the client, the security system may perform the verification of the safety of the API.

In this way, the security system according to the present embodiment may design a WAAP ecosystem that may defend against various attacks by granting a life cycle to the API. In addition, the security system may perform the client internal network security through an API registration and hash value verification process for the client API security. In addition, the security system may calculate the security grade for the API based on the verification result of the API registration and hash value verification process and apply the calculated security grade periodically, thereby maintaining the internal network security of the client more reliably.

Figure 3:
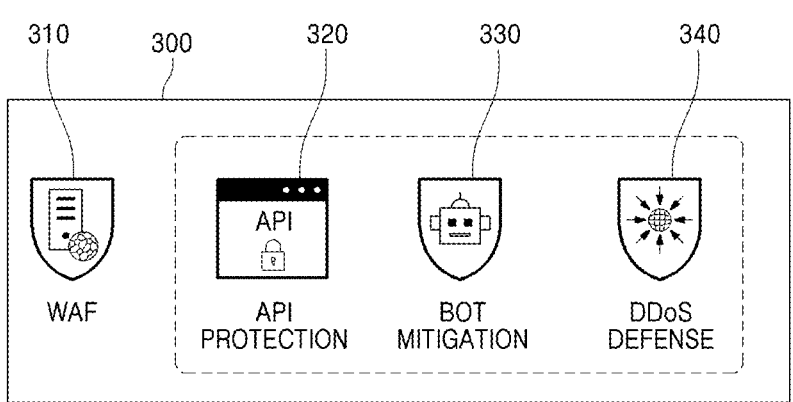
FIG. 3 is an exemplary diagram for describing main features of the WAAP of FIG. 2.

FIG. 3 is an exemplary diagram for describing main features of the WAAP of FIG. 2.

Referring to FIG. 3, the WAAP 300 is an evolved version of the WAF, and may be a security solution with additional web security functions in addition to a basic function of a WAF 310. That is, the WAAP 300 may have four core functions: the WAF 310, API protection 320, bot mitigation 330, and DDoS defense 340.

To describe each function in more detail, the WAF function may include detecting and blocking web attacks such as structured query language (SQL) injection and cross-site scripting (XSS). The WAF function may monitor all hypertext transfer protocol/hypertext transfer protocol secure (HTTP/HTTPS) protocol traffic transmitted to the web server or inspect a user's uniform resource locator (URL) in a request packet to prevent unintended content from being transmitted to the web application. In addition, the WAF function may monitor content of an HTTP response packet passing through the web server by applying a principle of a proxy server to prevent specific information from leaking.

The API protection function may mean protecting the API from misuse, malicious bot attacks, and other cyber security threats. In particular, the API protection function may expand according to the evolution of API security. In other words, as the API has expanded due to the emergence of the Internet of Things (IoT) and microservices architecture utilizing cloud native technologies, smooth communication and call routing between applications and across DevOps environment have become possible. High-quality APIs, such as representational state transfer (REST) and simple object access protocol (SOAP), coordinate application integration, specify data formats, and dictate call types, procedures, and rules. Furthermore, the web APIs, such as GraphQL, REST API, and SOAP API, change the environment by extending their functionality to include a wide range of integration functions across countless complex networks. Meanwhile, since the latest APIs rely greatly on API endpoints to implement their functionality, enterprises and security teams should adopt strong security measures to protect data and web services, and ultimately, to maximize the utilization of IT resources. The present embodiment may provide a method of granting a life cycle to an API which may be adopted as one of the strong security measures.

The bot mitigation function may include allowing the integrated web security system to transmit the confirmation message for the request when the data request is received from an external client (here, the client is a bot) to check that an abnormal response to the confirmation message is received from a client or a response is received from an abnormal IP address, thereby allowing the client to block the corresponding request.

The DDoS defense function may include allowing the integrated web security system to detect and block the DoS attack or the DDoS attack at the application layer, such as a plurality of message attacks for which the request is not completed, when the number of messages for which the request is not completed exceeds a certain number within a unit time.

The above-described security system may also be configured to automatically recognize problems occurring during system operation with a self-check function and transmit real-time alarms to the administrator. To this end, the security system may be configured to self-diagnose a resource status, a network status, and a hardware status, recognize risk situations such as security risks, and transmit an alarm to an administrator or perform an automatic recovery function based on self-diagnosis items and corresponding setting values.

Figure 4:
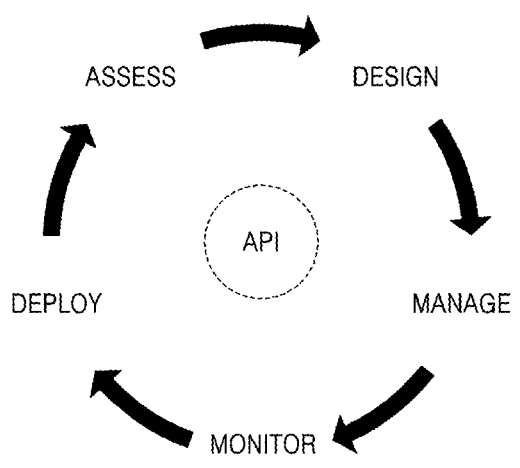
FIG. 4 is an exemplary diagram for describing an API life cycle that may be employed in a security method according to an embodiment of the present disclosure.

FIG. 4 is an exemplary diagram for describing an API life cycle that may be employed in a security method according to an embodiment of the present disclosure.

Referring to FIG. 4, the API life cycle may be configured to circulate the processes of designing, managing, monitoring, deploying, and assessing.

The designing means classifying and designing the level of the API by calculating the safety grade of the API.

The managing means registering and managing the API-related information and safety grade in an API DB of an off-chain and a blockchain of an on-chain. Here, the on-chain is a method of recording all transaction history occurring in a blockchain on the blockchain, and the off-chain is a method of recording transaction history occurring in a blockchain off the blockchain outside a blockchain network.

The monitoring refers to the process of verifying the integrity of data for the API information and safety grade registered on the blockchain and continuously and visually checking the data for the API information and safety grade.

The deploying refers to the process of distributing and storing information and safety grade data of a newly registered API on a blockchain network in an on-chain.

The assessing refers to a process in which clients within a linked network evaluate the API based on the API information and safety grade data registered on the blockchain in an on-chain.

The API level and its features in terms of web security that uses the above-described API are shown in Table 3 below.

TABLE 3

| API level | Feature |
|---|---|
| 1 | API that has no problem with known vulnerabilities or is secure. |
| 2 | API that has not been re-verified for more than 1 year or is authenticated by Level 2 WAAP |
| 3 | API that has been found to have vulnerabilities or is authenticated by Level 3 WAAP |

In addition, the levels and features of the WAAP, which is a type of integrated web security solution for the above-described API protection and web application security function, are exemplified in Table 4 below.

TABLE 4

| WAAP level | Feature |
|---|---|
| 1 | Firewall that has no problem with known vulnerabilities |
| 2 | Firewall that has no vulnerabilities discovered and has not been updated for over a year |
| 3 | Firewall with vulnerabilities discovered |

In this way, it is possible to perform the API security using the integrated web security solution. In particular, the security system according to the present embodiment implements a technology that performs the bot detection and DDoS defense and dynamically manages the API while performing the function of the basic WAF.

For example, the bot detection and blocking may include blocking the client request by checking that an abnormal response to the confirmation message is received from the client or a response is received from an abnormal IP address by allowing the integrated web security system to transmit the confirmation message for the request when the data request is received from an external client (here, the client is a bot).

In addition, the DDoS defense may include detecting and blocking the DoS attack or the DDoS attack at the application layer, such as a plurality of message attacks for which the request is not completed, when the number of messages for which the request is not completed exceeds a certain number within a unit time.

In addition, the integrated web security system of the present embodiment may be configured to automatically recognize problems occurring during system operation with the self-check function and transmit information or alarms about the recognized problems to the administrator and/or the linked blockchain network in real time.

To this end, the integrated security system may be configured to self-diagnose a resource status, a network status, and a hardware status, recognize risk situations such as security risks, and transmit an alarm to the administrator and/or the blockchain network or perform the automatic recovery function based on the self-diagnosis items and corresponding setting values.

Figure 5:
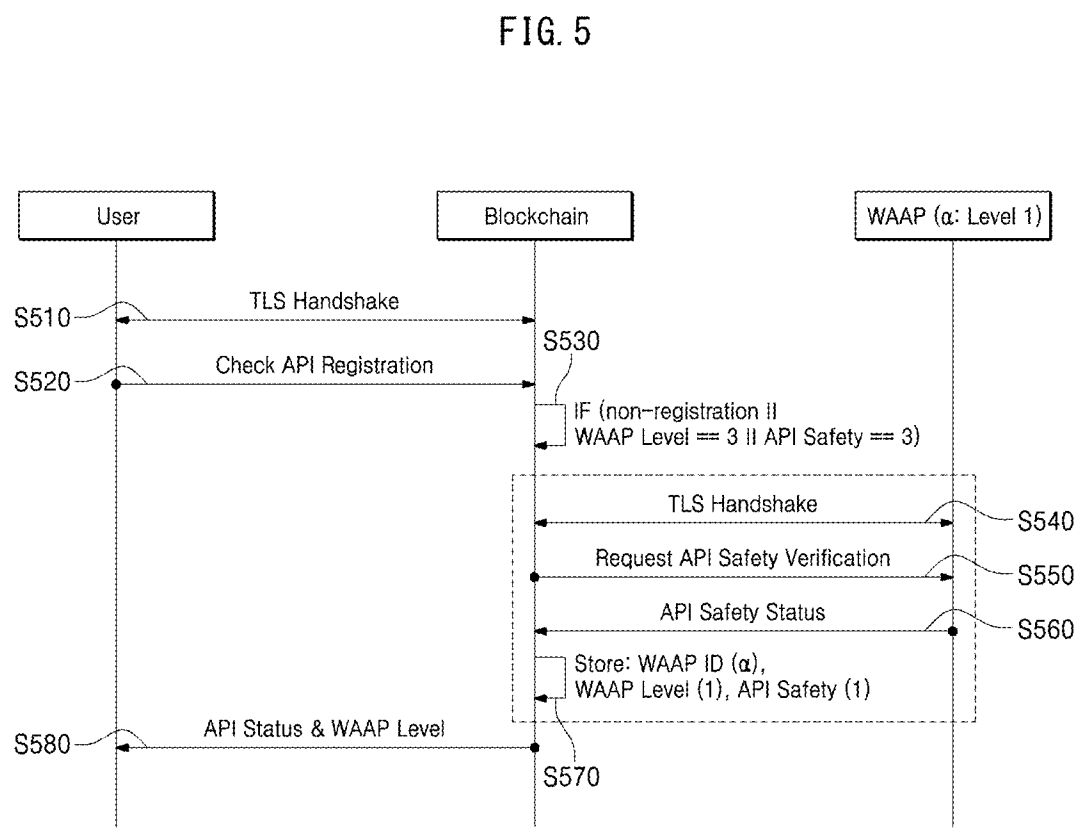

FIG. 5 is a flowchart for describing an API blockchain registration check and registration process that may be employed in a security method according to an embodiment of the present disclosure.

Referring to FIG. 5, a user may perform a transport layer security (TLS) handshake procedure for a blockchain and a TLS protocol (S510). The TLS handshake may mean session establishment for communication between the user and the blockchain.

Here, a user includes a user device connected to the Internet, and the blockchain may include a blockchain network composed of a plurality of nodes connected to the Internet. The blockchain may be implemented to store and compare WAAP identification information, WAAP level information, and API level information. For example, the blockchain may be configured to store data or information and compare the data or information through a smart contract, etc. The WAAP identification information may be expressed as a WAAP ID, and the API level information may include level information on API safety.

The WAAP described above is a type of integrated web security solution that is an evolved form of the WAF, and may include the WAF as a core feature, which is a basic function for web security, and an API protection function, a bot mitigation function, and a DDoS defense function as additional functions for web security.

Next, the user may check whether the API is registered on the blockchain (S520). That is, the user may transmit a confirmation request message to the blockchain to check whether specific API information is registered on the blockchain.

Next, the blockchain may determine whether the API requested by the user is registered on the blockchain based on the user's request for checking whether the API is registered (S530). For example, the blockchain may determine which of the following three conditions applies based on the user's request for the check of the API registration. That is, the blockchain may determine the following three conditions: the corresponding API is not registered on the blockchain (non-registration), the corresponding API information is registered on the blockchain but the registered API safety level is 3, or the safety grade of the corresponding API registered on the blockchain is 1 or 2 but the level of the WAAP, which is the integrated web security solution calculating the safety grade or determining the safety level of the corresponding API, is 3.

The conditions for requesting the check of the API registration of the blockchain for such API information are as follows.

[Conditions for Requesting Confirmation of API Registration]

$$\text{IF}(\text{non-registration}\|WAAP \text{ Lever} == 3\|API \text{ Safety} == 3)$$

According to the conditions above, "the API information is not registered on the blockchain," "WAAP information is registered on the blockchain but the API security level is 3," or "the security level of the API registered on the blockchain is 1 or 2 but the level of the WAAP for determining the security level is 3," the WAAP of level 1 and API security verification may be performed.

Next, for the API security verification, the blockchain may first perform the TLS handshake procedure with the WAAP of level 1. That is, the WAAP of level 1 may perform the TLS handshake procedure with the blockchain (S540). The TLS handshake may mean the session establishment for communication between the blockchain and the WAAP of level 1. The TLS handshake may be referred to as a security handshake in a broad sense. The WAAP of level 1 may mean the WAAP of security level 1.

After the session is established between the blockchain and the WAAP of level 1, the blockchain may request the WAAP to check the API safety grade. That is, the WAAP may receive the request for the API safety verification from the blockchain (S550).

The request for the API safety verification may include information related to the user, such as user identification information, API identification information, API configuration information, API setting information, API inventory information, and API usage information.

Next, the WAAP of level 1 may perform the API safety verification through a preset procedure or a verification module or verification model that performs such procedure according to the request of the blockchain, and transmit the verification result for the API safety status to the blockchain. That is, the blockchain may receive the verification result for the API safety status from the WAAP (S560). The verification result for the API safety status may include information such as the API safety grade.

Next, the blockchain may store WAAP identification information (ID, for example, a), WAAP level information (for example, level 1), and API safety grade information (for example, level 1) in a distributed data storage environment based on a chain-type link generated based on a peer to peer (P2P) method in the form of blocks (S570). The API safety grade information is information stored in the blockchain, and may include the ID of the WAAP with safety level 1 and a list of APIs with safety grade 1 registered on the corresponding WAAP. The process of storing such information may mean the process of completing synchronization of the list of APIs to the blockchain.

Then, the blockchain may transmit the API status and WAAP level obtained as the verification results for API safety verification to the user (S580). That is, the blockchain may guide the API information and WAAP grade to the user.

According to the present embodiment, the user may request the API information from the blockchain and receive the information on the API status and WAAP level from the blockchain.

The above-described process of requesting the API information from the blockchain may be substantially the same as the process of re-requesting the check of the API authenticated by the WAAP of level 3 to the blockchain. Therefore, the above-described "process of requesting the API information from the blockchain" may be used as a process of re-requesting the information on then API authenticated by the WAAP with safety grade 3 from the WAAP with safety grade 1.

FIG. 6 is a flowchart illustrating a WAAP vulnerability discovery and update process that may be employed in a security method according to an embodiment of the present disclosure.

Referring to FIG. 6, in order to perform the WAAP vulnerability discovery and update process, an API vulnerability researcher may establish the session with the blockchain through the TLS handshake procedure (S610). The API vulnerability researcher may include a user or a user device used by a researcher to discover the API vulnerability, and may be referred to simply as a researcher or a user.

When the TLS handshake procedure is completed, the researcher may register the discovered vulnerability and a sample code for the vulnerability on the blockchain (S620). The sample code may include a vulnerability test code or may be referred to as the vulnerability test code.

Next, when the vulnerability and its sample code are registered, the blockchain may notify all the WAAP(s) of the vulnerability and the sample code (S630). The notification of the vulnerability and the sample code of the blockchain may be transferred to all the WAAP(s) belonging to the blockchain network in a broadcast manner. In other words, the blockchain may propagate the WAAP vulnerability test API sample code to all the WAAP(s). This function may correspond to one of original functions of the blockchain, such as the "distributed synchronization" function.

Next, at least one WAAP(s) that has been notified of the vulnerability test API sample code may transmit the API safety status for the above-described WAAP vulnerability test API sample code to the blockchain (S640). That is, the WAAP may calculate the safety grade for the WAAP vulnerability test API sample code and then transmit the response value, which is the calculation result, back to the blockchain.

Next, the blockchain may check the API status by determining whether the safety grade for the API sample code transmitted as the response value by all the WAAP(s) is level 1 or level 3 (S650). That is, in the case of the WAAP for which the safety grade of malicious API sample code for vulnerability testing is calculated as 1, the blockchain may classify the WAAP as a vulnerable WAAP and adjust the level of the WAAP to 3. In addition, in the case of the WAAP for which the safety grade of the malicious API sample code for vulnerability testing is calculated as 3, the blockchain may classify the WAAP as a secure WAAP and update the level of the WAAP to 1.

Next, the blockchain may determine the WAAP, which transmits the level 1 as the response value, as the vulnerable WAAP when the safety grade for the received API vulnerability sample code is 1, set the safety level of the WAAP to be 3, and store the corresponding WAAP ID.

Meanwhile, when the safety grade for the received API vulnerability sample code is 3, the blockchain accurately classifies the harmful API sample code as the safety level 3 for the WAAP that transmits the corresponding level 3 as the response value, so the blockchain may set the safety level for the corresponding WAAP to be 1 and store the corresponding WAAP ID. Through this process, the blockchain may store the updated information on the WAAP ID, WAAP level, and vulnerability (S660).

According to the present embodiment, the researcher stores the vulnerability of the API and the corresponding sample code in the blockchain, and the blockchain receives the API safety status from all the WAAP(s) in the blockchain network based on the vulnerability and the sample code, checks the API status based on the API safety status received from each WAAP, and stores the WAAP ID, WAAP level, and vulnerable WAAP information or stores the WAAP ID, WAAP level, and vulnerability update information according to the checked API status.

Figure 7:
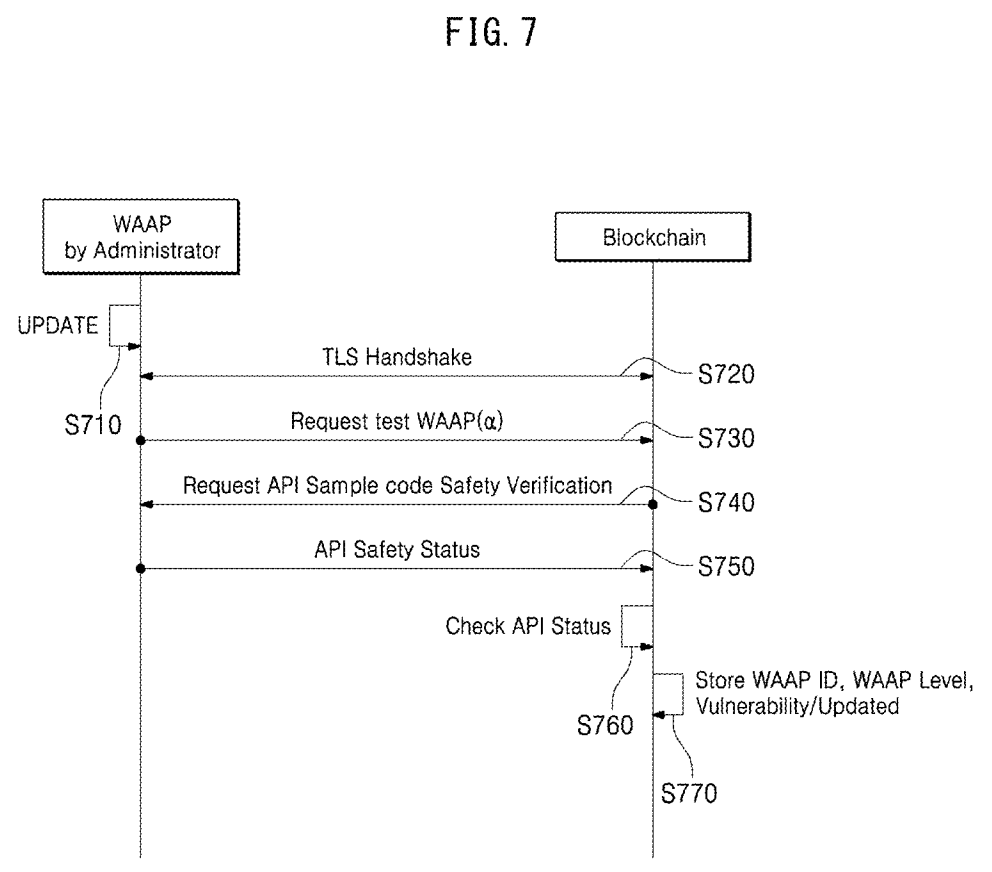

FIG. 7 is a flowchart for describing a level recovery and re-grade request process after a WAAP update that may be employed in a security method according to an embodiment of the present disclosure.

Referring to FIG. 7, the WAAP may perform a self-update procedure in administrator mode for the WAAP level recovery and re-grade request (S710). The administrator may perform an update for upgrading the safety grade of the WAAP with WAAP administrator authority. The WAAP in the administrator mode may be WAAP that is being used by an administrator or operating in administrator mode, such as WAAP that is being used by a user who has been authenticated as an administrator.

Next, the WAAP in the administrator mode may perform the TLS handshake procedure with the blockchain for the WAAP level recovery and re-grade request (S720).

After establishing the session with the blockchain through the TLS handshake, the WAAP may re-request the WAAP test for the recovery of the WAAP level adjusted by blockchain propagation vulnerability API sample code test result (S730). The identification information of the test WAAP may be expressed as, for example, alpha ($\alpha$). For example, in the case of the WAAP downgraded in the previous process, the WAAP level test may be re-requested from the blockchain after the update for the level recovery.

Next, the blockchain may request the API sample code safety verification with the WAAP. That is, the WAAP in the administrator mode may receive a request for the API sample code safety verification from the blockchain (S740). The API sample code safety verification may be performed by the blockchain transmitting the malicious API sample code for vulnerability testing to the corresponding WAAP and requesting the verification thereof. The API sample code safety verification is to check the stability of that WAAP, which is the integrated web security solution, at the administrator level for the malicious API sample code for vulnerability testing that has been previously registered.

Next, the WAAP may transmit the API safety status checked at the administrator level to the blockchain (S750). That is, the WAAP in the administrator mode may define a safety grade for a malicious API sample code for WAAP testing and transmit the verification result including the API safety status to the blockchain.

Next, the blockchain may check the API status (S760) and store the corresponding WAAP ID, WAAP level, and vulnerability information according to the safety grade of the checked API, or store the WAAP ID, WAAP level, and vulnerability update information (S770). That is, when the safety grade of a malicious API for specific WAAP transmission testing is 1, the blockchain may classify the WAAP as the vulnerable WAAP, downgrade the level of the WAAP to level 3, and store the downgraded WAAP. In addition, when the safety grade of the malicious API for specific WAAP transmission testing is 3, the blockchain may classify the WAAP as the stable WAAP, upgrade the level of the WAAP to level 1, and store the upgraded WAAP.

Figures 8, 9:
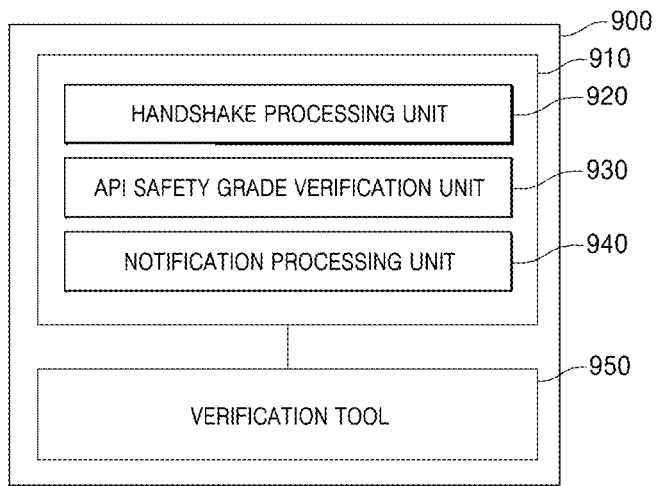
FIG. 8 is a schematic block diagram of a configuration of a security system according to another embodiment of the present disclosure.
FIG. 9 is a schematic block diagram of a main configuration of the WAAP that may be employed in the security system of FIG. 8.

FIG. 8 is a schematic block diagram of a configuration of a security system according to another embodiment of the present disclosure.

Referring to FIG. 8, the security system 500 may include at least one processor 510, a memory 520, and a transceiver 530 that is connected to a network and performs communication. The at least one processor 510 and memory 520 may be configured as at least one controller. The transceiver 530 may include a sub-communication system supporting a wired network or a wireless communication module (WCM) supporting a wireless network.

In addition, a security system 800 may further include an input interface device 840, an output interface device 850, a storage device 860, etc. In addition, the components included in the security system 800 may communicate with each other by being connected by a bus 870.

However, each component included in the security system 800 for providing differential security services may be connected through an individual interface or individual bus centered on the processor 810, rather than a common bus. For example, the processor 810 may be connected to at least one of the memory 820, the transceiver 830, the input interface device 840, the output interface device 850, and the storage device 860 through a dedicated interface.

The processor 810 may execute program commands stored in at least one of the memory 820 and the storage device 860. The processor 810 may be a central processing unit (CPU), a graphics processing unit (GPU), or a dedicated processor on which the security method according to the embodiments of the present disclosure is performed. The program command may include at least one command for implementing the above-described security method.

Each of the memory 820 and the storage device 860 may include at least one of a volatile storage medium and a non-volatile storage medium. For example, the memory 820 may include at least one of a read only memory (ROM) and a random access memory (RAM).

The security system 800 described above may be implemented as a desktop computer, a server, a mobile terminal, a laptop, a personal portable communication terminal, etc. The security system 800 may be referred to as a node, a server, a management system, a service system, etc., located on a wired network, a short-range wireless communication network, a mobile communication network, a satellite network, or a combination of these networks.

FIG. 9 is a schematic block diagram of a main configuration of the WAAP that may be employed in the security system of FIG. 8.

Referring to FIG. 9, a WAAP 900 is a level 1 security system, and may include a service provider 910 and a verification tool 950. The service provider 910 may include a handshake processing unit 920, an API safety grade verification unit 930, and a notification processing unit 940 that are implemented by at least one software module.

The WAAP 900 of the present embodiment may be performed based on the result of the blockchain verifying the corresponding API information in response to the user request to check whether the API is registered.

Each component of the WAAP 900 will now be described in more detail. The service provider 910 may register the API in the verification tool 950. In this case, the verification tool 950 may store the API, the API ID, and the hash. In addition, the verification tool 950 may transmit the ID and the hash to the service provider 910. In addition, the verification tool 950 may be configured to compare the hash value of the API with its own stored hash value.

Meanwhile, the handshake processing unit 920 mounted on the service provider 910 may perform the TLS handshake procedure to establish the session with the blockchain. Depending on the implementation, the handshake processing unit 920 may perform the security handshake procedure to establish the session between the service provider 910 and the verification tool 950.

The API safety grade verification unit 930 may receive the API safety grade verification request from the blockchain to the WAAP of level 1. In this case, the API safety grade verification unit 930 may transmit the API safety status information including the API safety grade verification result to the blockchain. In this case, the blockchain may receive the identifier of the WAAP with level 1 and the list of APIs with safety grade 1 registered on the WAAP from each WAAP and store the identifier and list in the blockchain. This can correspond to the completion of blockchain synchronization for a list of secure APIs.

Meanwhile, the API vulnerability researcher may register the vulnerability and sample code on the blockchain. The sample code may include the vulnerability test code. In this case, the blockchain may propagate the API sample code for WAAP vulnerability testing to all the WAAPs. This may be implemented by the unique "distributed synchronization" function of the blockchain.

The notification processing unit 940 may receive a notification propagated or broadcast from the blockchain. The notification may include the vulnerability of the WAAP and the API sample code for WAAP vulnerability testing. That is, when the vulnerability and the sample code are received through the notification processing unit 940, the API safety grade verification unit 930 may calculate the API safety grade based on the received API sample code and then transmit the API safety status information including the calculation result back to the blockchain.

In this case, the blockchain may classify the WAAP for which the safety grade of the malicious API sample code for vulnerability testing is calculated as 1 as the vulnerable WAAP and adjust its level downward to a lower level. In addition, the blockchain may classify the WAAP for which the safety grade of the malicious API sample code for vulnerability testing is calculated as 3 as the stable WAAP and update its level to a higher level.

Figure 10:
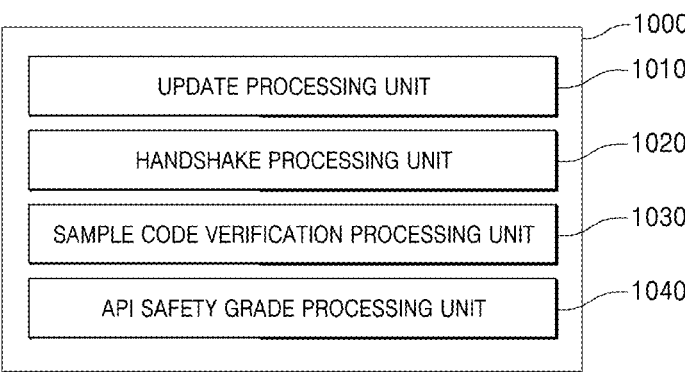
FIG. 10 is a schematic block diagram of the main configuration of the WAAP in the administrator mode that may be employed in the security system of FIG. 8.

FIG. 10 is a schematic block diagram of the main configuration of the WAAP in the administrator mode that may be employed in the security system of FIG. 8.

Referring to FIG. 10, a WAAP 1000 in an administrator mode may include an update processing unit 1010, a handshake processing unit 1020, a sample code verification processing unit 1030, and an API safety grade processing unit 1040.

The update processing unit 1010 may perform an update for WAAP level recovery with WAAP administrator authority.

The handshake processing unit 1020 may perform a security handshake for establishing the session with the blockchain. The security handshake may include the TLS handshake, but is not limited thereto and other security methods may be applied.

The sample code verification processing unit 1030 may request the level test of the WAAP from the blockchain. In the case of the downgraded WAAP, the sample code verification processing unit 1030 may request the WAAP level test from the blockchain after self-updating for the WAAP level recovery. The sample code verification processing unit 1030 may perform verification on the malicious API sample code for vulnerability testing from the blockchain and calculate the API safety grade.

The API safety grade processing unit 1040 may transmit the API safety status information including the API safety grade calculation of the sample code verification processing unit 1030 and the WAAP level adjustment result thereof to the blockchain.

According to the security system described above, a WAAP service API security grade calculation function that performs the safety grade calculation for vulnerabilities of each service API may be provided for enterprise service API security. In addition, a WAAP service API management function that generates the IDs and hash values for each service API and then matches the IDs and hash values or matches the hash values may be provided for the enterprise service API security.

In addition, according to the security system described above, a WAAP service API safety verification function that performs verification for a user request for safety check of the service API may be provided for the enterprise service API security. A prerequisite for the service API safety verification function may include that the service API is served as a standardized API to which consistent rules, patterns, and protocol standards are applied.

In addition, according to the security system described above, a user-active reverse WAAP function requesting a security verification of a service API from a WAAP-linked blockchain of a service providing company (corresponding to a service provider) may be provided for enterprise external user security. In addition, for the enterprise external user security, for example, a preemptive API vulnerability damage blocking function may be provided for announcing the hash value of the service API to the outside to prevent the forgery of the service API. In addition, for the enterprise external user security, for example, a secure user service usage environment providing function may be provided for providing a secure service API through a verification procedure of a service API.

In addition, according to the security system described above, the WAF function of the WAAP may be provided for enterprise internal network security. The WAF function may include DMZ zone service server security, bot detection, DDoS blocking, etc.

Figure 11:
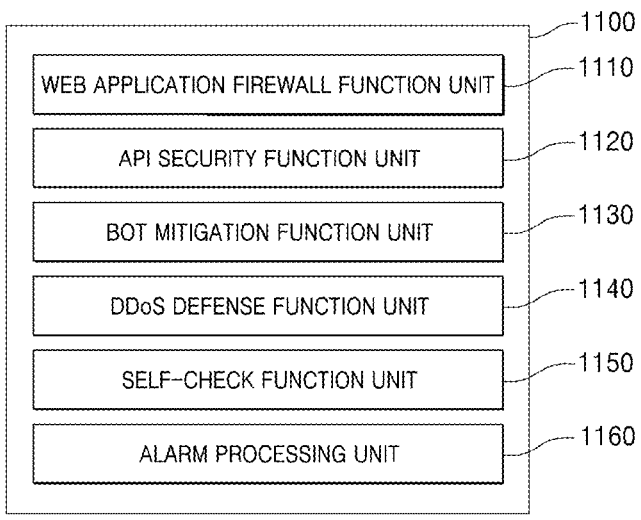
FIG. 11 is a block diagram illustrating a software module that may be employed in a security system according to another embodiment of the present disclosure.

FIG. 11 is a block diagram illustrating a software module that may be employed in a security system according to another embodiment of the present disclosure.

Referring to FIG. 11, a processor 1100 of the security system may include at least one software module, and the at least one software module may be configured to include a WAF function unit 1110, an API security function unit 1120, a bot mitigation function unit 1130, a DDoS defense function unit 1140, a self-check function unit 1150, and an alarm processing unit 1160.

The WAF function unit 1110 may be configured to respond to web attacks or respond to primary attacks for the purpose of collecting information for secondary attacks, as at least a part of the WAF function of the WAAP. The WAF function unit 1110 may include a WAF engine based on a plurality of rules and a custom rule function. The WAF engine may detect and block HTTP/HTTPS-based web attacks through logic analysis of signals or data of attackers or bypass attackers, thereby maintaining client internal network security.

The API security function unit 1120 is at least a part of the WAF function of the WAAP or the enterprise service API security function, and may calculate the security grade for the API, and check whether the API is safe or tampered through the API verification and guide the API to a user.

The bot mitigation function unit 1130 is at least a part of the WAF function of the WAAP or the enterprise service API security function, and may be configured to identify and detect bot fraud and block the bot fraud. The bot mitigation function unit 1130 may identify the bot fraud and block the attack attempt by using the unique information of the client (in this case, the attacker) through a preset suspicious access (SA) rule. Here, the SA rule may be used to determine characteristics of an automated attack tool such as a bot and block or restrict access of a client that is not a normal web browser.

The DDoS defense function unit 1140 is at least part of the WAF function of the WAAP, and may be configured to detect and block the DDoS attacks at the application layer. The DDoS defense function unit 1140 may detect and block attacks that repeatedly transmit uncompleted requests and overload the session, for example.

The self-check function unit 1150 may be configured to automatically recognize problems that may occur during the operation of the security device. The self-check function unit 1150 may be configured to perform real-time self-state self-diagnosis, recognition of a risk situation, an automatic recovery function operation, etc., according to the preset process. The automatic recovery function may be performed by preset self-diagnosis items and corresponding setting values.

The alarm processing unit 1160 may transmit an alarm to the administrator or client of the security device according to the preset risk level classification result for the self-diagnosis, the recognition of the risk situation, etc., and/or the value setting for alarm generation, when there is a usage setting for the alarm.

At least one of the software modules described above, or at least one of the WAF function unit 1110, the API security function unit 1120, the bot mitigation function unit 1130, the DDoS defense function unit 1140, the self-check function unit 1150, and the alarm processing unit 1160, may be configured with a program command.

In addition, the program command may include at least one command for implementing the security method. For example, the program command may include a handshake processing command, an API registration verification processing command, an API safety grade processing command, a notification processing command, an update processing command, a sample code verification processing command, etc.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A blockchain-based security method that is performed by an integrated web security solution (web application and API protection, WAAP) and using WAAP and application programming interface (API) level management, the blockchain-based security method comprising:

receiving an API safety grade check request from the blockchain under a session establishment with the blockchain, wherein, in the checking of the API safety grade, a security level for vulnerability of the API is checked automatically in management API data of the WAAP with a highest level of safety;

receiving an API sample code for WAAP vulnerability testing from the blockchain, wherein the API sample code is a malicious sample code;

calculating a safety grade for the API sample code for WAAP vulnerability testing; and transmitting information on the API safety grade to the blockchain.

2. The blockchain-based security method of claim 1, wherein the WAAP has a level 1 grade indicating the most secure WAAP in terms of security, and the blockchain stores WAAP identification information of the WAAP and a list of APIs with safety grade 1 registered on the WAAP.

3. The blockchain-based security method of claim 2, wherein blockchain synchronization with the corresponding WAAPs is completed for the list of APIs at safety grade 1, which is the safest level of security.

4. The blockchain-based security method of claim 1, further comprising transmitting information on the API safety grade status including the calculated safety grade to the blockchain.

5. The blockchain-based security method of claim 4, wherein the blockchain classifies a WAAP for which the safety grade of the API sample code for WAAP vulnerability testing is calculated as a highest level based on the information on the API safety grade status as a WAAP vulnerable to security and downgrades a level of the WAAP.

6. The blockchain-based security method of claim 4, wherein the blockchain classifies a WAAP for which the safety grade of the API sample code for WAAP vulnerability testing is calculated as a lowest level based on the information on the API safety grade status as a stable WAAP and upgrades a level of the WAAP.

7. The blockchain-based security method of claim 1, further comprising:

requesting a test of the WAAP from the blockchain;

receiving an API sample code safety grade confirmation request from the blockchain; and transmitting API safety grade status information including confirmation information on the API safety grade to the blockchain.

8. A blockchain-based security method that is performed by an integrated web security solution (web application and API protection, WAAP) and using WAAP and application programming interface (API) level management, the blockchain-based security method comprising:

requesting a test of a WAAP from the blockchain through a session established with the blockchain;

receiving an API sample code safety grade confirmation request from the blockchain; and performing a self-vulnerability test on the API sample code received from the blockchain;

calculating an API safety grade after performing the vulnerability test; and transmitting API safety grade status information including check information on the API safety grade to the blockchain, wherein the blockchain classifies a WAAP for which the safety grade of the API sample code for WAAP vulnerability testing is calculated as a highest level based on the information on the API safety grade status as a WAAP vulnerable to security and downgrades a level of the WAAP, or the blockchain classifies a WAAP for which the safety grade of the API sample code for WAAP vulnerability testing is calculated as a lowest level based on the information on the API safety grade status as a stable WAAP and upgrades a level of the WAAP.

9. The blockchain-based security method of claim 8, further comprising, before requesting the test of the WAAP, upgrading a function of the WAAP automatically with administrator authority of the WAAP.

10. A blockchain-based security system using an integrated web security solution (web application and API protection, WAAP) and application programming interface (API) level management, the blockchain-based security system comprising:

a memory; and at least one processor connected to the memory and executing a program including at least one command, wherein, by the at least one command, the processor allows the WAAP to receive an API safety grade confirmation request from the blockchain under a session establishment with the blockchain, confirm the API safety grade, and transmit check information on the API safety grade to the blockchain, wherein the processor further performs receiving an API sample code for WAAP vulnerability testing from the blockchain, calculating a safety grade for the API sample code for WAAP vulnerability testing, and transmitting information on an API safety grade status including the calculated safety grade to the blockchain.

11. The blockchain-based security system of claim 10, wherein the WAAP has a level 1 grade indicating the most secure WAAP in terms of security, the blockchain stores WAAP identification information of the WAAP and a list of APIs with safety grade 1 registered on the WAAP, and the blockchain completes blockchain synchronization with the corresponding WAAPs targeting the list of APIs with a highest level of safety grade of the security.

12. The blockchain-based security system of claim 10, wherein the blockchain classifies a WAAP for which the safety grade of the API sample code for WAAP vulnerability testing is calculated as a highest level based on the information on the API safety grade status as a WAAP vulnerable to security and downgrades a level of the WAAP.

13. The blockchain-based security system of claim 10, wherein the blockchain classifies a WAAP for which the safety grade of the API sample code for WAAP vulnerability testing is calculated as a lowest level based on the information on the API safety grade status as a stable WAAP and upgrades a level of the WAAP.

14. The blockchain-based security system of claim 10, wherein the processor further performs requesting the test of the WAAP from the blockchain, and receiving an API sample code safety grade confirmation request from the blockchain.

15. The blockchain-based security system of claim 14, wherein the processor further performs transmitting API safety grade status information including check information on the API safety grade to the blockchain.

16. The blockchain-based security system of claim 15, wherein the processor further performs self-upgrading the function of the WAAP with the administrator authority of the WAAP before the requesting of the test of the WAAP from the blockchain or requesting retest for WAAP level correction according to the WAAP level downgrade adjustment as a result of a previous test.

* * * * *